(12) United States Patent
Holland

(10) Patent No.: US 12,111,929 B2
(45) Date of Patent: Oct. 8, 2024

(54) RANSOMWARE PREVENTION

(71) Applicant: Field Effect Software Inc., Ottawa (CA)

(72) Inventor: Matthew Holland, Ottawa (CA)

(73) Assignee: Field Effect Software Inc., Ottawa (CA)

( * ) Notice: Subject to any disclaimer, the term of this patent is extended or adjusted under 35 U.S.C. 154(b) by 171 days.

(21) Appl. No.: 17/770,610

(22) PCT Filed: Oct. 20, 2020

(86) PCT No.: PCT/CA2020/051406
§ 371 (c)(1),
(2) Date: Apr. 20, 2022

(87) PCT Pub. No.: WO2021/077212
PCT Pub. Date: Apr. 29, 2021

(65) Prior Publication Data
US 2022/0292195 A1    Sep. 15, 2022

Related U.S. Application Data

(60) Provisional application No. 62/923,941, filed on Oct. 21, 2019, provisional application No. 63/059,151, filed on Jul. 30, 2020.

(51) Int. Cl.
G06F 21/56    (2013.01)
G06F 21/62    (2013.01)

(52) U.S. Cl.
CPC ........ *G06F 21/566* (2013.01); *G06F 21/6218* (2013.01); *G06F 2221/034* (2013.01)

(58) Field of Classification Search
CPC ................................................ G06F 2221/034
See application file for complete search history.

(56) References Cited

U.S. PATENT DOCUMENTS

| 10,193,918 B1 | 1/2019 | Patton et al. |
| 2010/0031360 A1 | 2/2010 | Seshadri et al. |

(Continued)

FOREIGN PATENT DOCUMENTS

| JP | 2006-134307 A | 5/2006 |
| JP | 2014-514651 A | 6/2014 |

OTHER PUBLICATIONS

International Search Report and Written Opinion in Intl. App. No. PCT/CA2020/051406, mailed Jan. 13, 2021.

(Continued)

*Primary Examiner* — Brian Whipple
(74) *Attorney, Agent, or Firm* — Sheppard Mullin Richter & Hampton LLP

(57) ABSTRACT

Ransomware attacks may be prevented by monitoring file access requests. When a process requests a directory listing, the results provided may be modified based on whether the process is trusted or not. For trusted processes, the results provided are the actual directory listing, while the results provided to processes that aren't trusted may be modified to include seeded files. Access to the seeded files may be monitored to determine if the process is associated with a ransomware attack, and steps taken to mitigate an attempted ransomware attack. Ransomware may also be prevented by ensuring that only trusted processed are allowed to access certain files. In order to provide an improved user experience, the processes can be determined automatically from a system structure and their trustworthiness determined.

33 Claims, 11 Drawing Sheets

(56) References Cited

U.S. PATENT DOCUMENTS

| | | |
|---|---|---|
| 2010/0058472 A1 | 3/2010 | Dotan |
| 2012/0255021 A1 | 10/2012 | Sallam |
| 2015/0058987 A1 | 2/2015 | Thure et al. |
| 2015/0082399 A1* | 3/2015 | Wu .................... H04L 63/0838 726/10 |
| 2016/0180087 A1* | 6/2016 | Edwards .............. H04L 63/145 726/24 |
| 2017/0206353 A1 | 7/2017 | Jai et al. |
| 2019/0065745 A1 | 2/2019 | Araujo et al. |
| 2019/0392180 A1* | 12/2019 | Dasarathan ........... G06F 13/385 |

OTHER PUBLICATIONS

Extended European Search Report dated Oct. 5, 2023, issued in related European Patent Application No. 20879371.1 (6 pages).
International Preliminary Report on Patentability for Application No. PCT/CA2020/051406 mailed on Apr. 26, 2022, 6 pages.
Notice of Reasons for Refusal dated Jul. 16, 2024, issued in related Japanese Patent Application No. 2022-523660, with English machine translation (14 pages).

* cited by examiner

RANSOMWARE PREVENTION

CROSS-REFERENCE TO RELATED APPLICATIONS

This application claims priority to U.S. Provisional Patent Application No. 62/923,941 filed Oct. 21, 2019 and U.S. Provisional Patent Application No. 63/059,151 filed Jul. 30, 2020 the entirety of each are hereby incorporated by reference for all purposes.

TECHNICAL FIELD

The current disclosure relates to security of computer systems and in particular to preventing ransomware attacks against computer systems.

BACKGROUND

Ransomware attacks are a type of security threat to computer systems where an attacker attempts to deny access to a computer system's data, or to the computer system itself, by encrypting user files until a ransom is paid to the attackers. The cyberattack named 'WannaCry' ransomware attack utilized an unpatched exploit in the Microsoft Windows™ operating system implementation of the Server Message Block (SMB) protocol leaving millions of computer system potentially vulnerable.

Ransomware can be treated as a virus or other security threat where effort is taken to prevent the ransomware from being installed on, or accessing, the computer system however recent ransomware attacks have exploited security vulnerabilities of operating systems that were unknown or unpatched. The impact of ransomware attacks can be further mitigated with the use of regular backups of the computer system which can allow at least a portion of data to be restored however recent data may not be retrievable and considerable time and expense will be involved.

An additional, alternative and/or improved system for preventing or mitigating ransomware attacks is desirable.

SUMMARY

In accordance with the present disclosure, there is provided a method of preventing a ransomware attack comprising: receiving at a file system an input/output (IO) request from a requesting process; determining a trust classification of the requesting process based on whether the requesting process is a trusted process; modifying results of the IO request based on the trust classification of the requesting process; and monitoring one or more IO requests of the modified results from the requesting process when the requesting process is determined to have an untrusted trust classification.

In a further embodiment, the method further comprises one or more of: restricting further file access of a process that is untrusted when the process attempts to access one or more files of the modified results; and quarantining the requesting process.

In a further embodiment of the method, limiting further file access comprises one or more of: preventing the process that is untrusted from reading files; preventing the process that is untrusted from writing files; preventing the process that is untrusted from deleting files; and preventing the process that is untrusted from moving files.

In a further embodiment of the method, modifying the results comprises: when the requesting process is untrusted, including seeded files in the results provided to the requesting process; and when the requesting process is trusted, excluding the seeded files from the results provided to the requesting process.

In a further embodiment of the method, the seeded files are stored on a storage medium and removed from results presented to the requesting process when it is trusted.

In a further embodiment of the method, the seeded files are identified using one or more of: a defined naming convention; and a list of seeded file names.

In a further embodiment of the method, the seeded files are added to the results presented to the requesting process when it is untrusted.

In a further embodiment of the method, only the seeded files are presented as the results to the requesting process when it is untrusted.

In a further embodiment of the method, the file system runs in kernel mode and the requesting process runs in user mode or kernel mode.

In a further embodiment of the method, monitoring the one or more IO requests of the modified results comprises: detecting a write process to one or more of the modified results; determining if content being written by the write process is likely encrypted; and blocking the write process when the content being written is determined to likely be encrypted.

In accordance with the present disclosure, there is further provided a system for preventing a ransomware attack comprising: a processor for executing instructions; a memory for storing instructions, which when executed by the processor, configure the system to perform a method comprising: receiving at a file system an input/output (IO) request from a requesting process; determining a trust classification of the requesting process based on whether the requesting process is a trusted process; modifying results of the IO request based on the trust classification of the requesting process; and monitoring one or more IO requests of the modified results from the requesting process when the requesting process is determined to have an untrusted trust classification.

In a further embodiment of the system, the method configured by the instructions further comprises one or more of: restricting further file access of a process that is untrusted when the process attempts to access one or more files of the modified results; and quarantining the requesting process.

In a further embodiment of the system, limiting further file access comprises one or more of: preventing the process that is untrusted from reading files; preventing the process that is untrusted from writing files; preventing the process that is untrusted from deleting files; and preventing the process that is untrusted from moving files.

In a further embodiment of the system, modifying the results comprises: when the requesting process is untrusted, including seeded files in the results provided to the requesting process; and when the requesting process is trusted, excluding the seeded files from the results provided to the requesting process.

In a further embodiment of the system, the seeded files are stored on a storage medium and removed from results presented to the requesting process when it is trusted.

In a further embodiment of the system, the seeded files are identified using one or more of: a defined naming convention; and a list of seeded file names.

In a further embodiment of the system, the seeded files are added to the results presented to the requesting process when it is untrusted.

In a further embodiment of the system, only the seeded files are presented as the results to the requesting process when it is untrusted.

In a further embodiment of the system, the file system runs in kernel mode and the requesting process runs in user mode or kernel mode.

In a further embodiment of the system, monitoring the one or more IO requests of the modified results comprises: detecting a write process to one or more of the modified results; determining if content being written by the write process is likely encrypted; and blocking the write process when the content being written is determined to likely be encrypted.

In accordance with the present disclosure, there is further provided a non-transitory computer readable media having stored thereon instructions, which when executed by a processor of a computer system, configure the computer system to perform a method comprising. receiving at a file system an input/output (IO) request from a requesting process; determining a trust classification of the requesting process based on whether the requesting process is a trusted process; modifying results of the IO request based on the trust classification of the requesting process; and monitoring one or more IO requests of the modified results from the requesting process when the requesting process is determined to have an untrusted trust classification.

In a further embodiment of the non-transitory computer readable media, the method configured by the instructions further comprises one or more of: restricting further file access of a process that is untrusted when the process attempts to access one or more files of the modified results; and quarantining the requesting process.

In a further embodiment of the non-transitory computer readable media, limiting further file access comprises one or more of: preventing the process that is untrusted from reading files; preventing the process that is untrusted from writing files; preventing the process that is untrusted from deleting files; and preventing the process that is untrusted from moving files.

In a further embodiment of the non-transitory computer readable media, modifying the results comprises: when the requesting process is untrusted, including seeded files in the results provided to the requesting process; and when the requesting process is trusted, excluding the seeded files from the results provided to the requesting process.

In a further embodiment of the non-transitory computer readable media, the seeded files are stored on a storage medium and removed from results presented to the requesting process when it is trusted.

In a further embodiment of the non-transitory computer readable media, the seeded files are identified using one or more of: a defined naming convention; and a list of seeded file names.

In a further embodiment of the non-transitory computer readable media, the seeded files are added to the results presented to the requesting process when it is untrusted.

In a further embodiment of the non-transitory computer readable media, only the seeded files are presented as the results to the requesting process when it is untrusted.

In a further embodiment of the non-transitory computer readable media, the file system runs in kernel mode and the requesting process runs in user mode or kernel mode.

In a further embodiment of the non-transitory computer readable media, monitoring the one or more IO requests of the modified results comprises: detecting a write process to one or more of the modified results; determining if content being written by the write process is likely encrypted; and blocking the write process when the content being written is determined to likely be encrypted.

In accordance with the present disclosure, there is further provided a method of preventing a ransomware attack comprising: processing a system structure to automatically determine a file type to process mapping between a plurality of file types and processes used in accessing respective ones of the plurality of file types; for each of the processes in the file type to process mapping, evaluating a trustworthiness of the process; receiving at a file system an input/output (IO) request from a requesting process; determining if the requesting process is a trusted process; and allowing or blocking the IO request based on the determination of if the requesting process is trusted.

In a further embodiment, the method further comprises: for each of the processes in the file type to process mapping generating a fingerprint of the process that was evaluated for trust; and when determining if the requesting process is trusted: determining a requesting process fingerprint of the requesting process; and comparing the requesting process fingerprint with the previously determined fingerprint of the process that was evaluated for trust, wherein, allowing or blocking the IO request is further based on the comparison of the requesting process fingerprint and the previously determined fingerprint.

In a further embodiment of the method, if the requesting process fingerprint and the previously determined fingerprint do not match, re-evaluating the trustworthiness of the requesting process.

In a further embodiment of the method, the system structure comprises a Windows registry.

In a further embodiment of the method, processing the Windows registry to automatically determine the file type to process mapping comprises: determining registered applications from a first known location in the registry, wherein each registered application in the first known location specifies a respective second location in the registry; for each of the determined registered applications: determining from the respective second location, file types associated with the respective registered application, each of the file types specifying a third location in the registry; and for each of the file types, determining from the respective third location, one or more file access commands each associated with a respective process executable located on the file system.

In a further embodiment of the method, the system structure comprises a macOS system structure.

In a further embodiment of the method, processing macOS system structure to automatically determine the file type to process mapping comprises: using an API to identify a plurality of UTIs on a given host; and correlate UTI mappings to the registered applications or bundles that support them.

In accordance with the present disclosure, there is further provided a system for preventing a ransomware attack comprising: a processor for executing instructions; and a memory for storing instructions, which when executed by the processor, configure the system to perform a method comprising: processing a system structure to automatically determine a file type to process mapping between a plurality of file types and processes used in accessing respective ones of the plurality of file types; for each of the processes in the file type to process mapping, evaluating a trustworthiness of the process; receiving at a file system an input/output (IO) request from a requesting process; determining if the requesting process is a trusted process; and allowing or blocking the IO request based on the determination of if the requesting process is trusted.

In a further embodiment of the system, the method configured by executing the instructions further comprises: for each of the processes in the file type to process mapping generating a fingerprint of the process that was evaluated for trust; and when determining if the requesting process is trusted: determining a requesting process fingerprint of the requesting process; and comparing the requesting process fingerprint with the previously determined fingerprint of the process that was evaluated for trust, wherein, allowing or blocking the IO request is further based on the comparison of the requesting process fingerprint and the previously determined fingerprint.

In a further embodiment of the system, if the requesting process fingerprint and the previously determined fingerprint do not match, re-evaluating the trustworthiness of the requesting process.

In a further embodiment of the system, the system structure comprises a Windows registry.

In a further embodiment of the system, processing the Windows registry to automatically determine the file type to process mapping comprises: determining registered applications from a first known location in the registry, wherein each registered application in the first known location specifies a respective second location in the registry; for each of the determined registered applications: determining from the respective second location, file types associated with the respective registered application, each of the file types specifying a third location in the registry; and for each of the file types, determining from the respective third location, one or more file access commands each associated with a respective process executable located on the file system.

In a further embodiment of the system, the system structure comprises a macOS system structure.

In a further embodiment of the system, processing macOS system structure to automatically determine the file type to process mapping comprises: using an API to identify a plurality of UTIs on a given host; and correlate UTI mappings to the registered applications or bundles that support them.

In accordance with the present disclosure, there is further provided a non-transitory computer readable media having stored thereon instructions, which when executed by a processor of a computer system, configure the computer system to perform a method comprising: processing a system structure to automatically determine a file type to process mapping between a plurality of file types and processes used in accessing respective ones of the plurality of file types; for each of the processes in the file type to process mapping, evaluating a trustworthiness of the process; receiving at a file system an input/output (IO) request from a requesting process; determining if the requesting process is a trusted process; and allowing or blocking the IO request based on the determination of if the requesting process is trusted.

In a further embodiment of the non-transitory computer readable media, the method configured by the instructions further comprises: for each of the processes in the file type to process mapping generating a fingerprint of the process that was evaluated for trust; and when determining if the requesting process is trusted: determining a requesting process fingerprint of the requesting process; and comparing the requesting process fingerprint with the previously determined fingerprint of the process that was evaluated for trust, wherein, allowing or blocking the IO request is further based on the comparison of the requesting process fingerprint and the previously determined fingerprint.

In a further embodiment of the non-transitory computer readable media, if the requesting process fingerprint and the previously determined fingerprint do not match, re-evaluating the trustworthiness of the requesting process.

In a further embodiment of the non-transitory computer readable media, the system structure comprises a Windows registry.

In a further embodiment of the non-transitory computer readable media, processing the Windows registry to automatically determine the file type to process mapping comprises: determining registered applications from a first known location in the registry, wherein each registered application in the first known location specifies a respective second location in the registry; for each of the determined registered applications: determining from the respective second location, file types associated with the respective registered application, each of the file types specifying a third location in the registry; and for each of the file types, determining from the respective third location, one or more file access commands each associated with a respective process executable located on the file system.

In a further embodiment of the non-transitory computer readable media, the system structure comprises a macOS system structure.

In a further embodiment of the non-transitory computer readable media, processing macOS system structure to automatically determine the file type to process mapping comprises: using an API to identify a plurality of UTIs on a given host; and correlate UTI mappings to the registered applications or bundles that support them.

BRIEF DESCRIPTION OF THE DRAWINGS

Further features and advantages of the present disclosure will become apparent from the following detailed description, taken in combination with the appended drawings, in which.

DETAILED DESCRIPTION

Ransomware attacks can be prevented or mitigated by preventing a process from over-writing files with encrypted content or preventing files that have been copied to a remote location from being deleted either directly or by exploiting file rename semantics. While most processes are trusted processes that can over-write file contents with appropriate permission, some processes may be of unknown trustworthiness and should be only allowed to overwrite data if it is likely not a ransomware attack. As described further herein, likely ransomware processes can be identified in various ways, including for example by seeding files to be presented to the untrusted process when a directory listing is requested. Access to the seeded files may then be monitored and if a process that is untrusted is accessing seeded files, further access can be blocked or other mitigation actions taken such as suspending or quarantining the untrusted process. The ransomware prevention functionality may be implemented as a file system filter or mini filter that can process all input/output (IO) requests of a system. While seeding files can help detect ransomware processes, rather than attempting to determine what processes are not to be trusted, it is possible to determine what processes are trusted. Determining what processes are trusted for accessing different file types can be difficult to do without configuration by an individual in order to identify the applications that can be used to access and/or edit various file types. As an alternative to, or in addition to, identifying possible ransomware attacks by seeding files, as described further below it is possible to automatically determine processes used to access different file types and to determine if the processes are trusted.

Figure 1:
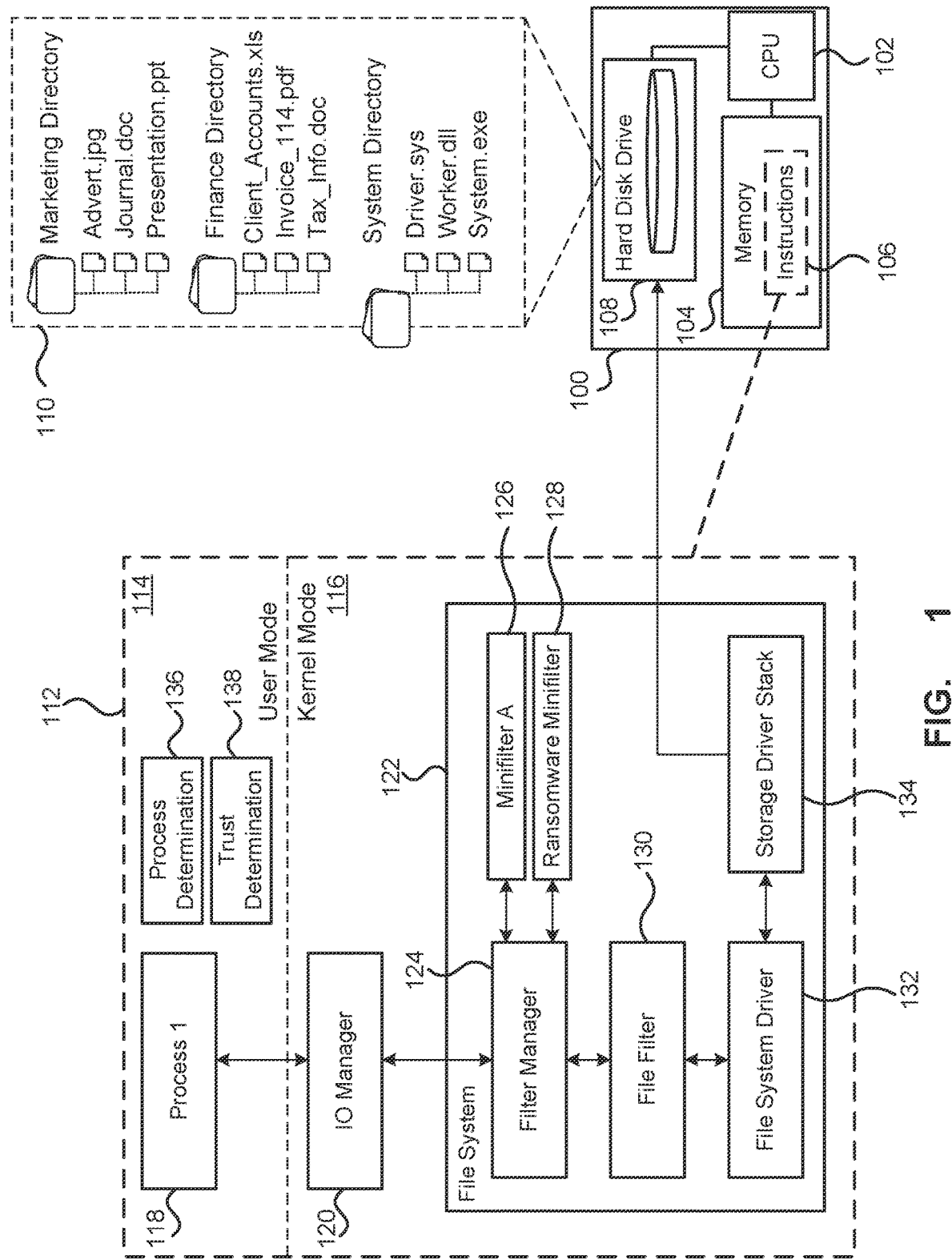
FIG. 1 depicts a computer system for preventing or mitigating ransomware attacks.

FIG. 1 depicts a computer system for preventing or mitigating ransomware attacks. The computer system may be, for example a desktop computer, a laptop, a server or other computing device running an operating system such as Windows™, macOS™, Linux™, Chrome™, Android™, iOS™, iPadOS™. The process described is applicable to the Windows™ operating system however may also be applicable to operating systems vulnerable to ransomware attacks. The computer system 100 may be a standalone computer or may be located in a network environment such as a corporate network or may be a personal computer. Regardless of the manufacture or form factor of the computer, it may comprise a central processing unit (CPU) 102 for executing instructions in order to configure the computer system 100 to provide various functionality. The computer system 100 comprises a memory 104 that is operatively coupled to the CPU 102 and stores instructions 106 for execution by the CPU 102. The computer 100 may further include a non-volatile storage, depicted as a hard disk drive 108, although other devices may provide non-volatile storage including for example solid state drives, flash memory, optical storage, network attached storage, network shares etc. Further, although the hard disk drive 108 is depicted as being internal to the computer 100, it is possible that the hard drive, or other non-volatile storage, may be external to the computer 100. The non-volatile storage devices may store various files 110 in one or more directories.

The files 110 may be stored in one or more directories which may include files that may be valuable or sensitive, either to an individual, corporation or other entity. For example, the files may include user documents, multimedia files, a company's financial information stored in a finance directory, and as such, if access to the files is denied, for example, by an external party encrypting them, the user or company may be impacted. Directories with valuable or sensitive files may be vulnerable to ransomware attacks. Other files may not be sensitive or may be easily restored if access to them were blocked. For example, system files may be restored by reinstalling applications or operating systems.

The stored instructions, when executed, may configure the computer 100 to provide an operating system (OS) that supports the basic functions of the computer. The OS 112 may provide a user mode 114 and kernel mode 116. Applications generally run in user mode 114, while core functionalities of the OS run in kernel mode 116. An application is run as one or more processes 118 in user mode, or as one or more dynamic libraries residing in one or more processes. The processes can access functionality in kernel mode through defined interfaces such as an Application Programming Interface (API) or user-mode drivers. For example, a file editor application may request directory information using an API for listing files in a directory. The OS may include an input/output (IO) manager 120, or other operating system component that manages file I/O, that manages the communication between applications, or the processes of applications, and interfaces provided by a plurality of device drivers. The communication between operating system and the device drivers may be done using I/O request packets (IRPs) that are sent between operating system components and drivers. Drivers may use a layered model. For example, a stack of drivers may be associated with the process of accessing files stored on a hard drive.

The OS 112 may provide a file system 122 that allows processes to create, read, list, update, and delete files on one or more storage devices. File requests received at 10 manager 120 may be forwarded to the file system. The file system 122 may allow filters to be applied to file system requests. For example, a filter may be applied that determines if a requesting process is authorized to access the requested file. The filters may be provided as one or more file filters, or may be provided as one or more mini-filters registered with a filter manager 124. The filter manager 124 intercepts requests and passes the IRP to filters and registered mini-filters in a specified order. As depicted, a plurality of mini-filters 126, 128 may be registered with the same filter manager 124. Ransomware prevention functionality may be provided as a mini-filter 128 registered with a filter manager 124 or as a legacy file filter 130. The filters and mini-filters may modify the request and/or the results. A file system driver 132 receives the modified request and forwards it to the appropriate storage driver stack 134. The storage driver stack 134 prepares the request for the hardware and returns the results. The results may be passed back to filters and mini-filters in order to modify any results. Although not depicted in FIG. 1 the ransomware prevention functionality may be provided as a File System Filter driver.

The ransomware prevention functionality may prevent ransomware attacks by altering file listings in order to make it difficult for malicious processes to identify real files. Further, the altered file listings may be used to identify malicious processes. Additionally, or alternatively, the ransomware prevention functionality may prevent file access based on whether a process is trusted or not. Process determination functionality 136 may be used to determine what processes are used by a computer for accessing different file types. Trust determination functionality 138 may then evaluate the process, or the executable of the process, in order to determine if it is trusted. Whether a process is to be trusted may differ depending upon the computing device, user, entity etc. For example, a home user may trust an application or process of the application, if it is from a known developer or other known source, while in a corporate environment, there may be a restricted or limited list of applications that may be used or are trusted.

As described in further detail below, the ransomware mini-filter 128, or possible ransomware (or malicious software) filter functionality, may receive a directory request, or the results of the request, from a process. The results that are to be provided to the process can be modified based on whether or not the requesting process is deemed as a trusted or known process. Trusted processes are presented with results identifying the actual files stored in the directory, while the results presented to processes that aren't trusted or untrusted are seeded with additional seed files within the directory listing that would be more likely to be accessed prior to the actual files. Whether a process is trusted or untrusted may be determined in various ways. For example, a white list may be provided for trusted processes and any process not on the white list may be considered untrusted. Further, the trust classification of a process may be determined periodically based on characteristics of the process. For example a trust classification engine may determine whether a process is trusted or untrusted based on various factors including where the application was installed from, the name, times the process runs, network activity of the process, file system activity of the process, signed/unsigned dynamic modules loaded within the address space, non-attributable executable code within the address space, etc. Untrusted processes may include both legitimate processes that may not be trusted as well as illegitimate processes that are explicitly not trusted. The ransomware mini-filter 128 functionality may monitor file access requests from the processes that aren't trusted in order to determine if the process is attempting to access any of the seeded files. If the process attempts to access a seeded file, the ransomware mini-filter functionality may limit further file access of the process. The seeded files may be named in a manner that will place them at the beginning of the results returned to the process. For example the seed files may be inserted alphabetically before the actual files. The seed files are associated with common file extension types such as but not limited to .DOC, .DOCX, XLA, XLSX, .PPT, .PPTX, .ODT, .RTF, .TXT, .PDF, .JPG, .MPG, .MP4, etc. If the process is a ransomware process, or if the process contains injected ransomware, the process may attempt to encrypt the files beginning with the first in the directory list, however the ransomware functionality can detect the attempted encryption of the files that were seeded at the beginning of the directory listing. The use of the ransomware mini-filter 128 may protect a computer system from ransomware attacks without adversely impacting the performance of the file system for trusted processes.

Figure 2:
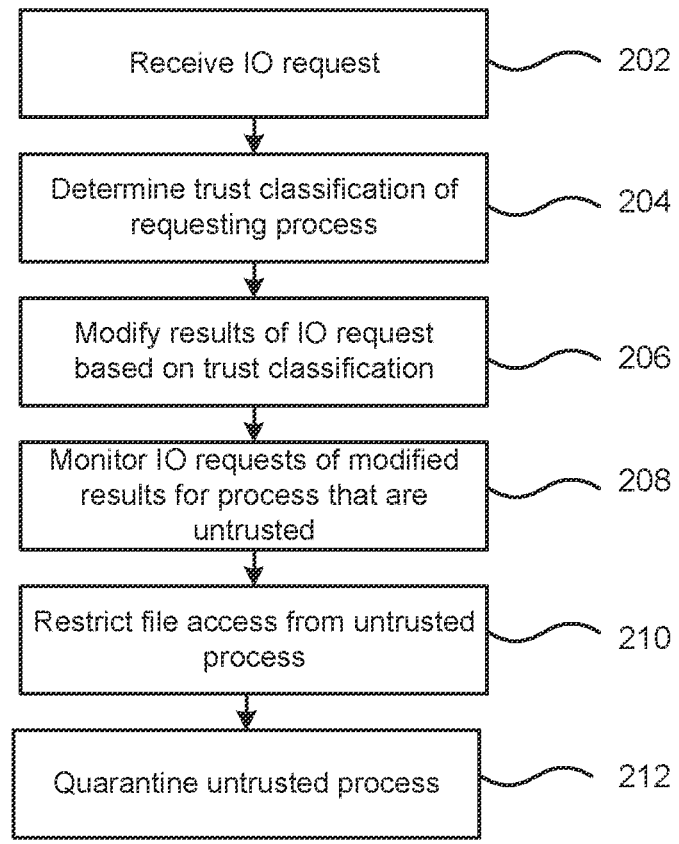
FIG. 2 depicts a method of mitigating ransomware attacks.

FIG. 2 depicts a method of mitigating ransomware attacks. The method 200 may be implemented within the file system of an operating system that runs in kernel mode. For example, the ransomware prevention method 200 could be implemented as a mini-filter that registers with a filter manager of the file system. The method 200 receives an IO request (202) to retrieve a directory listing. The IO request may be received prior to the results being retrieved, or may be received along with the results. The IO request is associated with the requesting process and may be provided in an IO request packet (IRP) that can be sent between file system components including filters, mini-filters and drivers of the file system. Each of the components can modify the IRP as it processes the request and/or results. Subsequent to receiving the IO request, a trust classification of the requesting process is determined (204). The trust classification may identify the process as being trusted or not trusted. Processes that are not trusted may be of an unknown trustworthiness. That is, processes that are untrusted may still be a valid process that should be able to access the file system. That is, not all processes that are untrusted are considered unsafe. Once the trust classification of the requesting process is determined, it is used to modify results of the IO request based on the determined trust classification (206). Requesting processes that are determined to be trusted are presented with results to the IO request for directory listings as if the ransomware prevention functionality were not present. In contrast, a process that is untrusted is presented with results to the IO request that include one or more seeded files. As described in further detail below, the seeded files may be stored on the hard drive and removed from the results presented to trusted processes, or the seeded files may be added to the results presented to the untrusted process. The seeded files presented to the processes that are not trusted may be named in a manner that locates the seeded files at the top of the result list, or the files may be seeded throughout the result list. Ransomware processes may generally start encrypting files at the top of the results list and as such, will attempt to encrypt one of the seeded files prior to encrypting any of the actual files in the directory. The further IO requests of the requesting untrusted process monitored for requests of the modified results (208). The IO requests may be monitored to detect file access to the seeded files by a process that is not trusted. Since the seeded files are created to detect ransomware attacks, a normal process, even if untrusted, typically will not access the seeded files. As described in further detail below, the file access can be monitored for reading a seeded file, writing to a seeded file, as well as possibly comparing content that is being written to the seeded file in order to help determine an appropriate action to take. For example, a process that is not trusted may be able to read a seeded file without taking action, while writing to or attempting to delete a seeded file may trigger a mitigation action. After monitoring the IO requests, further file access from the untrusted processes may be restricted (210). For example, if a process attempts to write to a seeded file, the process may be blocked from further file access. Further, the process may be quarantined (212), killed or suspended or marked as an illegitimate process.

Figure 3B:
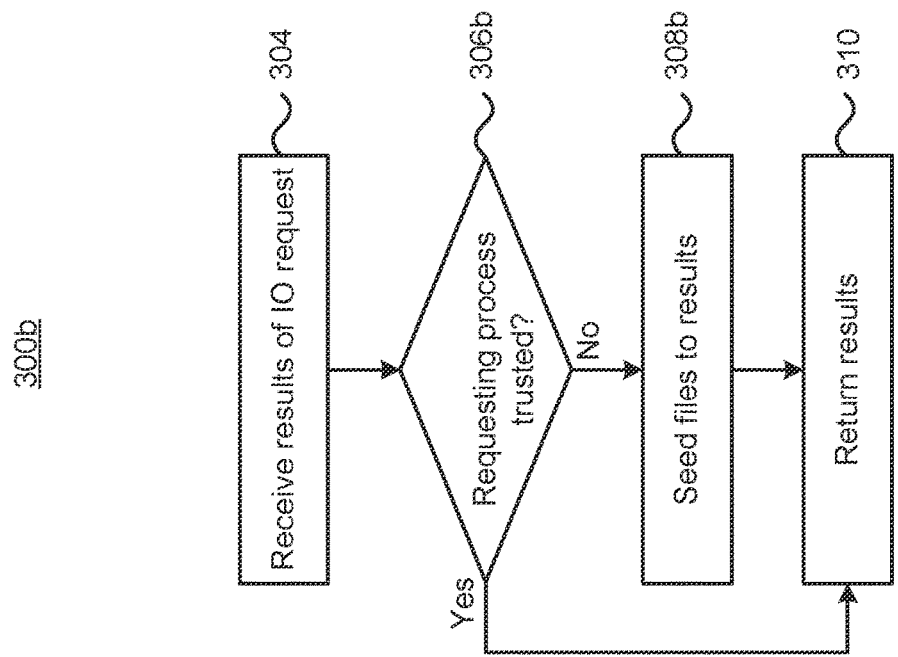
FIGS. 3A and 3B each depict a respective method for use in mitigating ransomware attacks.
Figure 3A:
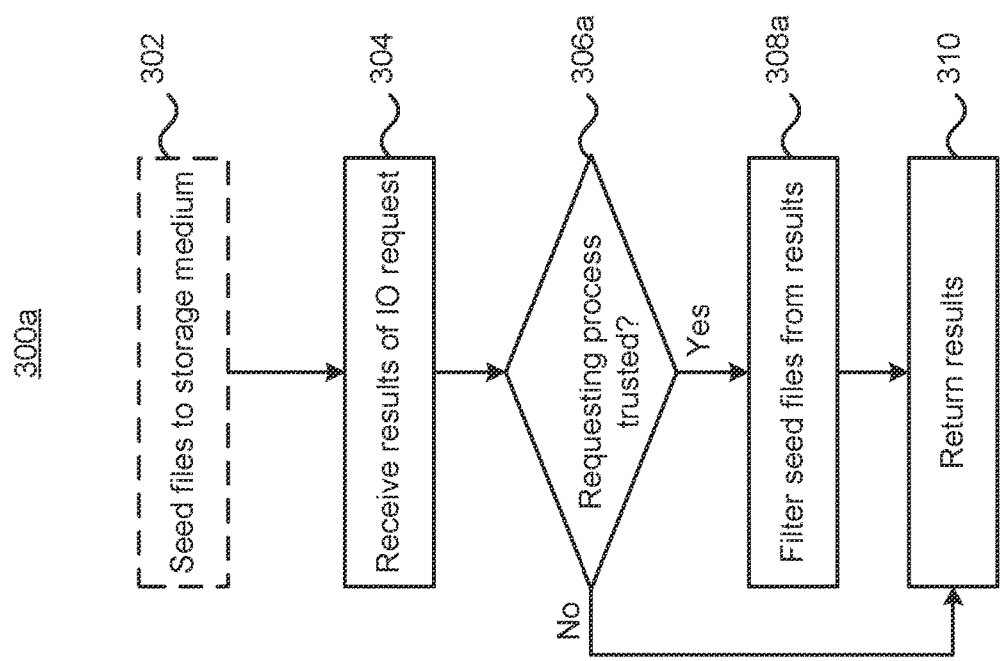

FIGS. 3A and 3B each depict a respective method for use in mitigating ransomware attacks. FIG. 3A depicts a method in which seeded files are saved to the hard drive, or other non-volatile storage medium. The method 300a seeds files to the storage medium (302). The files may be seeded to every directory or to only select directories. The seeding of the files may be done so that the type of the seeded files generally match the type of the actual files in a directory. For example, if a directory has files that are half word documents and half images, the seeded files may generally match the composition and so half of the seeded files are word documents and the other half are images. The names of the seeded files may be used to locate the seeded files at various locations within the result list. The results of a directory listing are typically presented in alphabetical order and as such, a seed file named '1111seedfile.doc' would likely appear first in the results. Although it is believed to be particularly useful to locate the seeded files at the top of the results list since ransomware is likely to start encrypting files at the top of the results, it is possible to locate seeded files in different locations throughout the results. Further, while it is possible to only seed a limited number of files, including as few as a single file, it is possible to seed a file for each actual file in a directory. Although seeding of the files is depicted as occurring once at the beginning, it is possible to update or modify the seeded files on an ongoing basis. After files are seeded, the results of an IO request for a directory listing are received (304). The results will include both real files as well as the seeded files. The trust classification of the requesting process is determined (306a) and if the requesting process is trusted (Yes at 306a) the seeded files are removed from the results (308a). The seeded files in the results may be identified in various ways. For example, a list of names of files that have been seeded may be maintained and checked to determine if any of the files in the results are present. Additionally or alternatively, characteristics of the files of the results may be used to identify seeded files. For example the name of the file may be used to identify seeded files, such as by comparing to a particular naming convention. Additional characteristics such as file size and/or date of creation may be used to identify the seeded files. Once the seeded files have been removed from the results the results can be returned to the requesting process (310). By removing the seeded files presented to trusted processes, only the actual files will be presented. When the requesting process is not determined to be trusted (No at 306a), the results, which include the seeded files, are returned to the requesting process (310). Accordingly, a process that is not trusted will receive both actual files and seeded files.

FIG. 3B depicts a method in which seeded files are not saved to the hard drive, or other non-volatile storage medium and rather are inserted into the results. As described above with reference to FIG. 3A, seeded files were stored to the hard drive and then removed from results presented to trusted processes. In contrast, the method 300b does not store any seeded files to the hard drive or other non-volatile storage medium, but rather seeds the files into the results presented to processes that aren't trusted. As with the method 300a, the method 300b receives results of an IO request for a directory listing (304). The trust classification of the process is determined (306b) and if the process is not trusted (No at 306b), the results are seeded with files (308b). The seeding of files into the results may be done in a similar manner to the seeding of files to the hard drive described above. For example, the names of files may be used to position the seeded files within the results. The types of seeded files may also be chosen to match the file type composition of the directory. Once the results have been modified with the seeded files, the results are returned (310). If the process is determined to be a trusted process (Yes at 306b), the results, without any seeded files, are returned (310).

As described above, seed files may be presented to processes that are determined to not be trusted. The files may be seeded in various ways. For example, a directory may be seeded with a single file that is named to be located at the top of the results list, or seeded files may be named to be located at one or more locations among the actual files. The files seeded to a directory may vary based upon the directory the files are being seeded to. For example, a directory may be profiled to determine what types of files are present along with the name of the files. Files may be seeded based on the profile of the directory so that the profile of the seeded files matches the profile of the directory. The names of the seeded files may be generated to place the seeded files in desired locations. A single file may be seeded in a directory, or a plurality of files may be seeded. It is possible to seed a file for each actual content file in a directory with the seeded files named to have a lower alphabetical ordering compared to the actual file name to ensure that the seeded file will be listed before the actual file. Additionally or alternatively, directories may be monitored in order to update the seeded files as new real content files are created and/or existing content files are removed. While dynamically updating seeded files may be more effective at preventing ransomware attacks, the processing required may put an unacceptable processing burden on the computer system, depending upon the processing power of the computer system. In addition to seeding files in directory results presented to processes that are not trusted, the ransomware prevention functionality also monitors IO requests from processes that are not trusted in order to detect when a process is attempting to access a seeded file in order to take appropriate action.

As described above, when providing results to a process, the trust characteristics of a requesting process may be determined. The determination of the trust characteristics of a process may be based on numerous factors, including where the application or process was installed from, when the process or application was installed, legitimately loaded dynamic libraries, injected dynamic libraries (if any), how often the process or application is run, files and directories that are normally accessed by the application or process. While certain processes may be trusted, not all processes that are not trusted may be equally untrusted. The appropriate action to take when a process that is not trusted access or attempts to access seeded files may depend on a number of factors, including for example the particular directory in which the file being accessed is, the trustworthiness of the requesting process, etc.

Figure 4A:
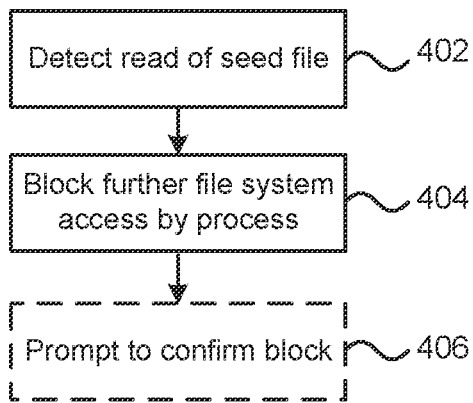
FIGS. 4A, 4B, and 4C each depict a respective method for use in mitigating ransomware attacks.
Figure 4B:
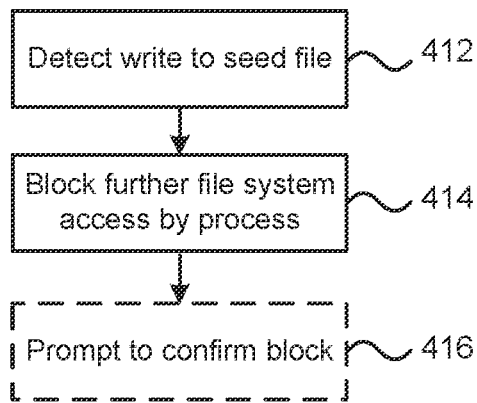
Figure 4C:
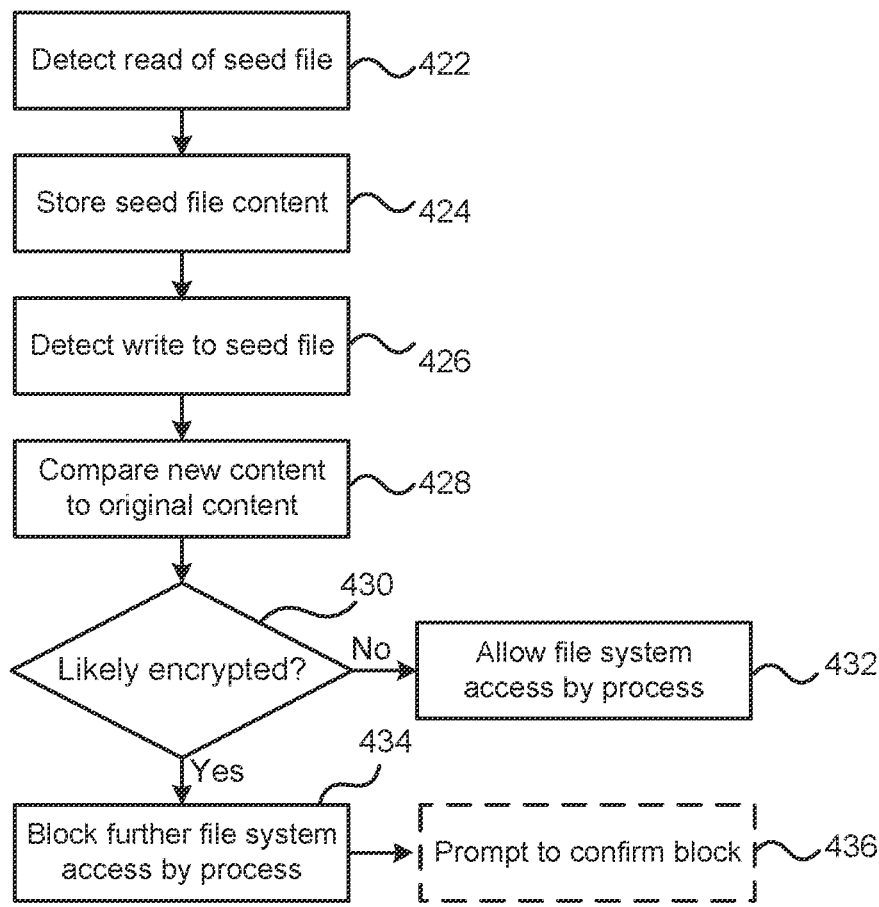

FIGS. 4A, 4B, and 4C each depict a respective method for use in preventing ransomware attacks. As depicted in FIG. 4A the method 400 may detect a file read IO request for a seeded file from a process that is not trusted (402). Upon detecting the file read of the seeded file, any further file system access by the process may be blocked (404). Accordingly, if a process attempts to read a seeded file, it may be prevented from performing any other file system actions and as such, if the process were a ransomware process, it would not be able to encrypt any files. After blocking a process from further file system access, it is possible to prompt a local user or administrator to confirm that the process should be blocked (406). The prompt may be on the local computer or may be a remote notification to a network administrator or security personnel to take appropriate action. Regardless of if the prompt or notification is provided locally or remotely, the prompt may be to confirm the block, provide a notification about a silent block, and/or notify an administrator about the actions taken. Although depicted as occurring after blocking file system access, it is possible to prompt a user or admin to confirm that the process should be blocked prior to actually blocking the process. Further, prompting a user or admin may be done in various ways, including for example displaying a confirmation box to the user, displaying a list of blocked processes to the user, etc.

FIG. 4B depicts a method 410, which is similar to method 400, except that rather than detecting a read to a seed file as described above, the method 410 detects a write IO request to a seed file (412). Upon attempting to write to a seed file, further file system access by the process may be blocked (414). As described above, after blocking file system access by a process, a user or admin may be prompted to confirm that the process should be blocked as described above with regard to FIG. 4A.

FIG. 4C depicts a further method 420 of limiting file access for processes that are not trusted. The method 420 detects an IO request from a process that is not trusted to read a seeded file (422). Upon detecting the read access, the seed file contents are stored (424). It is noted that if the seed file uses a standard format and content, the seed file may already be stored. Upon detecting a write to the seed file (426) the content being written to the file is compared to the original content (428) to determine if the file being written is likely encrypted (430). It may be possible to determine if file is being encrypted by comparing content at the beginning of the file, or file locations that typically do not change very much. For example, a file may have a header section which may not change substantially even if the contents of the file are changed. When a process attempts to encrypt a file, the header may also be encrypted and as such will substantially change in comparison to the header of the original file. If the write is determined to likely not be encrypting the file (No at 430), further file system access by the process may be allowed (432). If however, it is determined that the file write is likely to be encrypting the content (Yes at 430), further file system access by the process may be blocked (434). A user or admin may be prompted to confirm blocking of file system access by the process (436) as described above with regard to FIG. 4A.

As described above with reference to FIGS. 4A-4C, it is possible limit file system access to processes in various ways. It will be appreciated that which of the methods 400, 410 or 420 are used may be based upon how sensitive the data on the computer system is, how many processes run on the computer that are not trusted, and/or other possible factors.

Figure 5:
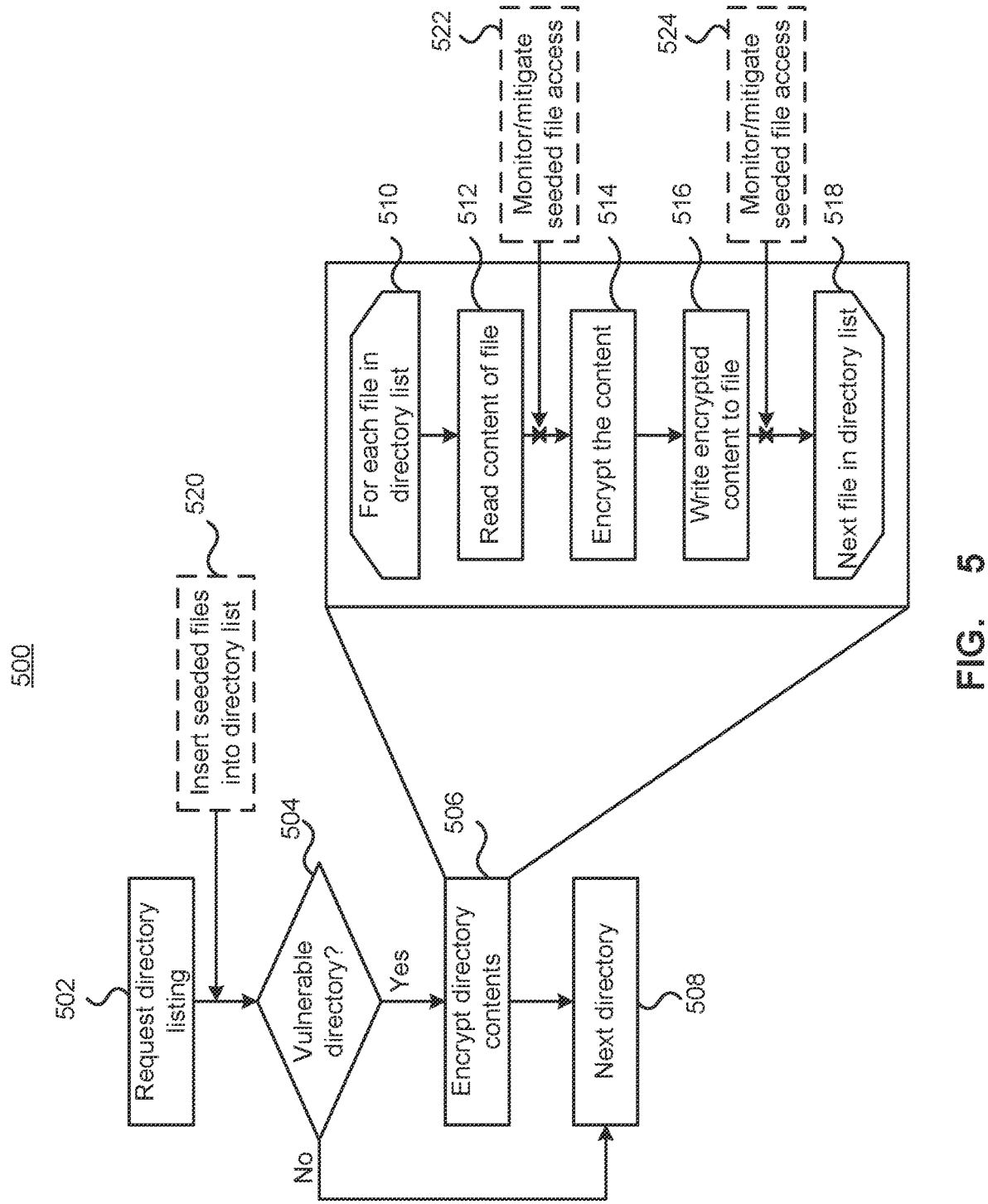
FIG. 5 depicts a ransomware attack process and mitigation of the attack.

FIG. 5 depicts a ransomware attack process and possible prevention of the attack. The ransomware process will first be described and then how the ransomware prevention functionality described above can prevent such a ransomware attack will be described. The process 500 begins with the ransomware process requesting a directory listing (502). The ransomware process may receive the directory listing results and determine if it is a valuable directory (504). Whether the ransomware considers the directory to be vulnerable may be based for example on the types of files present in the directory, the name of the directory, the number of files, etc. If the directory is not considered vulnerable (No at 504) as it contains valuable or sensitive data for the user, the ransomware process may proceed to the next directory (508). If the directory is considered to be vulnerable (Yes at 504), the files can be encrypted (506). The encryption would typically begin with the first file in the results list and for each of the files (510) the process reads the content of the file (512), encrypts the file (514), writes the encrypted file (516) and then proceeds with the next file in the results list (518). As described above, without the malware prevention functionality, the malware process can encrypt valuable files and extract a ransom to decrypt the files.

The malware prevention functionality described above may be used to prevent a malware process, such as that described in FIG. 5 from encrypting any files. As depicted in FIG. 5, when the ransomware process requests a directory listing, the malware prevention functionality inserts seeded files in the directory list that is returned (520). As described above, the seeded files may be named so that they are located at the top of the directory list. When the ransomware process begins to encrypt the files, the first file read will be a seeded file and the ransomware prevention functionality monitors the access and can prevent further access to the file system (522). Accordingly, the ransomware process will not be able to read or write anything further from or to storage. If the ransomware prevention allows the process to read the file, the ransomware process may encrypt the file and then attempt to write the encrypted content to the file. The ransomware prevention process may detect the attempted write to the seeded file and block further file system access (524) and so prevent any actual files from being encrypted.

Alternatively, the ransomware prevention functionality may compare the content being written to the original content of the seeded file to determine if the file is being encrypted and if it is likely to be encrypted, the process may be blocked from further file system access.

As described above, the ransomware prevention functionality can prevent process of unknown trustworthiness from encrypting files while still allowing trusted processes, and even legitimate process that are of unknown trustworthiness, access to the file system.

Figure 6B:
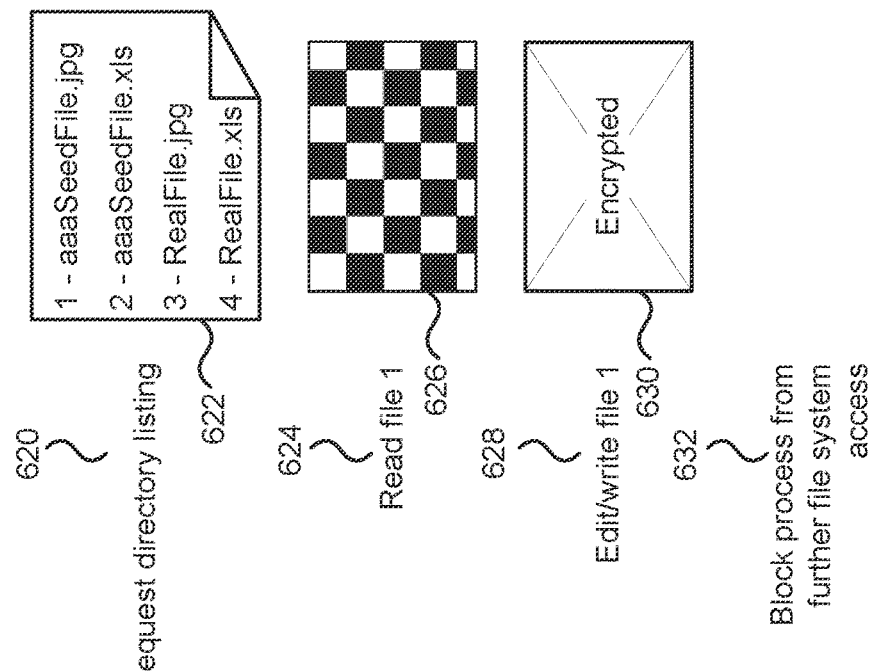
FIG. 6B depicts an untrusted process accessing a file on a computer system implementing ransomware mitigation functionality.
Figure 6B:
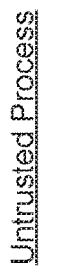
Figure 6A:
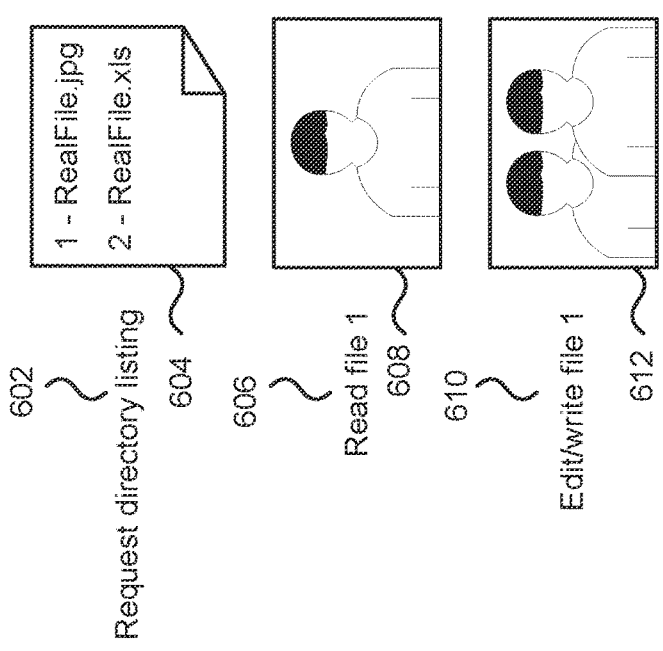
FIG. 6A depicts a trusted process accessing a file on a computer system implementing ransomware mitigation functionality.

FIG. 6A depicts a trusted process accessing a file on a computer system implementing ransomware mitigation functionality. As depicted, when a trusted process attempts to access a file, it may first request a directory listing (602), which will return a list of actual files (604). The trusted process may read one of the files (606), and for example display or otherwise use the content, which is depicted as displaying a picture 608. The trusted process may then edit and store (610) the file content 612. For trusted processes, no seeded files are presented and the process will only ever be presented with the actual real file contents of directories.

FIG. 6B depicts an untrusted process accessing a file on a computer system implementing ransomware mitigation functionality. As depicted an untrusted process may request a directory listing (620) and receives a list 622 of both the real files and seeded files. If the untrusted process is a ransomware process, the process is likely to begin encrypting files starting at the top of the list and as such will attempt to read the first file in the list (624) which will be a seeded file. The seeded files may have dummy content, depicted as a checkerboard pattern 626, or may have content copied from other actual files. The ransomware process may encrypt the file 630 and then attempt to write the encrypted file (628). The ransomware prevention functionality can detect the attempt to write the encrypted content, or any attempt to write, to the seeded file and may block the ransomware process from further file system access (632). Accordingly, the ransomware prevention functionality described above will allow trusted processes to access all files as normal, while malicious untrusted processes will be presented with one or more seeded files which may be subsequently used to identify the malicious activity of the process and block it from further file system access. Legitimate processes that are not trusted may be presented with the actual files along with the seeded files. However, a legitimate process will likely not attempt to write to the seeded files and as such will function as normal.

The ransomware prevention functionality has been described above with particular reference to an implementation using MiniFilters, which are provided in the Windows operating system. It will be appreciated that other operating systems may not use MiniFilters or file filters, however will include components that provide similar functionality for monitoring and controlling file system access. The ransomware prevention functionality may be provided in other file system components that manage the file system access in different operating systems.

The ransomware attach prevention described above attempts to prevent ransomware attacks by presenting possible ransomware processes with seeded files, or otherwise hiding real files. However, as described further below, it is also possible to prevent ransomware attacks by ensuring only trusted processes are allowed to access files. Allowing only trusted processes to access files may be used as alternative, or in addition, to the file seeding described above. While it is possible to restrict file access to trusted processes it can be difficult to identify all processes that should be trusted. As described further below, it is possible to automatically identify trusted processes.

Figure 7:
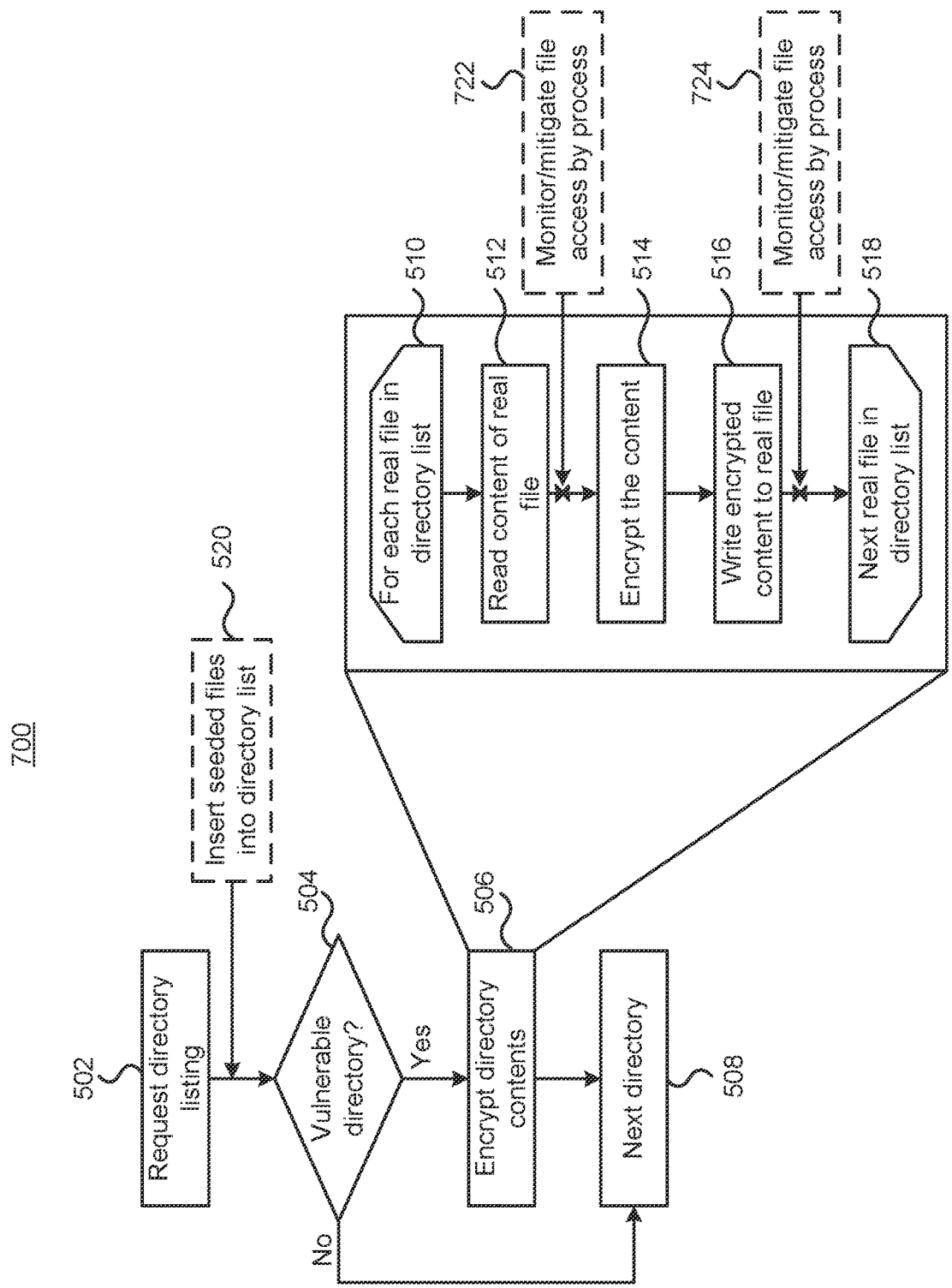
FIG. 7 depicts a ransomware attack process and further mitigation of the attack.
Figure 8:
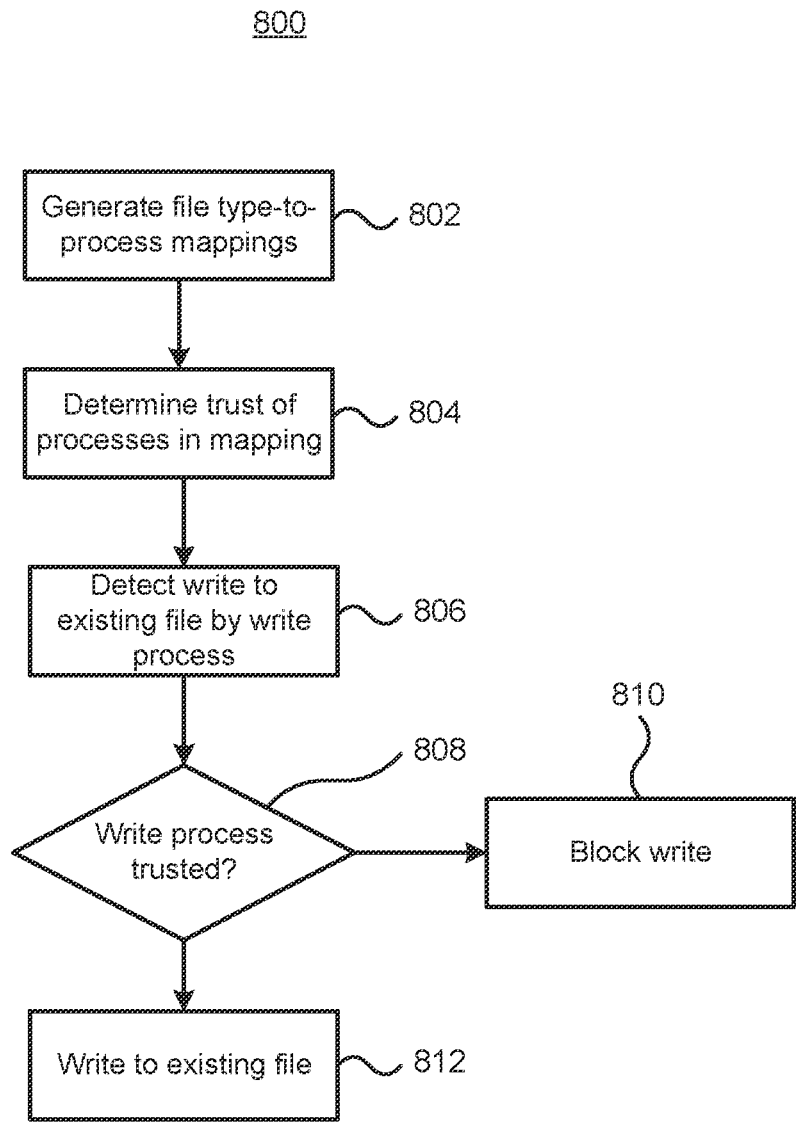
FIG. 8 depicts a process based attack mitigation method.

FIG. 7 depicts the ransomware attack process of FIG. 5 and possible prevention of the attack based on trust of processes. As described above, the process 500 begins with the ransomware process requesting a directory listing (502). The ransomware process may receive the directory listing results and determine if it is a valuable directory (504). Whether the ransomware considers the directory to be vulnerable may be based for example on the types of files present in the directory, the name of the directory, the number of files, etc. If the directory is not considered vulnerable (No at 504) as it contains valuable or sensitive data for the user, the ransomware process may proceed to the next directory (508). If the directory is considered to be vulnerable (Yes at 504), the files can be encrypted (506). The encryption would typically begin with the first file in the results list and for each of the files (510) the process reads the content of the file (512), encrypts the file (514), writes the encrypted file (516) and then proceeds with the next file in the results list (518). As described above, without the malware prevention functionality, the malware process can encrypt valuable files and extract a ransom to decrypt the files. When the ransomware process requests a directory listing, the malware prevention functionality inserts seeded files in the directory list that is returned (520). As described above, seeded files may be used to prevent ransomware processes from accessing legitimate files. However, if a ransomware process is able to somehow identify the legitimate files a ransomware attack can be prevented by monitoring or mitigating file access based on the process used to access the file. The file access monitoring/mitigation (722) may be performed when a process attempts to read the content of a real file. Additionally or alternatively, the file access monitoring/mitigation (724) may be performed when a process attempts to write the content of a real file FIG. 8 depicts a process based attack mitigation method. The method 800 may be implemented by one or computing devices. In order to allow file access based on trusted processes, it is necessary to determine processes, or the executables, that can be used to access various files. Once the processes are determined, the trust worthiness of the process can be determined, and if the process accessing a file is trusted the access can proceed. The method 800 generates file type to process mappings (802) for different file types on a computing system. The mappings can be generated automatically from a system structure that maintains what executables or applications can be used to access different file types. For example, in Windows™ operating systems, the system structure may be provided by the registry. The system structure can indicate the location of executables that can be used to access different file types. For example, the system structure may be used to determine that the executable for editing a word document using Microsoft™ Word is located at "C:\Program Files (x86)\Microsoft Office\Office16\WINWORD.EXE". It will be appreciated that the specific installation location may change based on for example different versions and or user settings. Once the file type to process mappings are determined, the trustworthiness of each of the processes is then determined (804). Whether a process, such as WINWORD.EXE is trusted or not may be determined in various ways, including for example determining if the executable is signed by a trusted source, whether the executable passes a virus scan, whether the executable is a known executable for accessing the file type, whether the executable is known to be malicious, whether a trusted user has indicated the executable is trusted, etc. Once the trustworthiness of the executables has been determined, the trusted processed may be allowed to access files.

Subsequent to determining the trustworthiness of the processes, a file access, such as a write to an existing process may be detected (806). The detected file write is made from a particular process, referred to as the write process, and it is determined if the write process, or the executable of the write process, is trusted (808). If the write process is trusted (Yes at 808) the file write or access is allowed to proceed. If the write process is not trusted (No at 808), the file write or access is blocked.

Using the system structure to determine the executables able to access different file types allows a list of possible executables to be determined and then evaluated for trustworthiness. After automatically determining the trustworthiness of processes, the information may be used to control the file access. If the process is altered after its trustworthiness is evaluated, it is possible that a previously trusted process could be replaced with a malicious process and allowed to access files. As described further below, the trust of modified processes can be re-evaluated.

Figure 9:
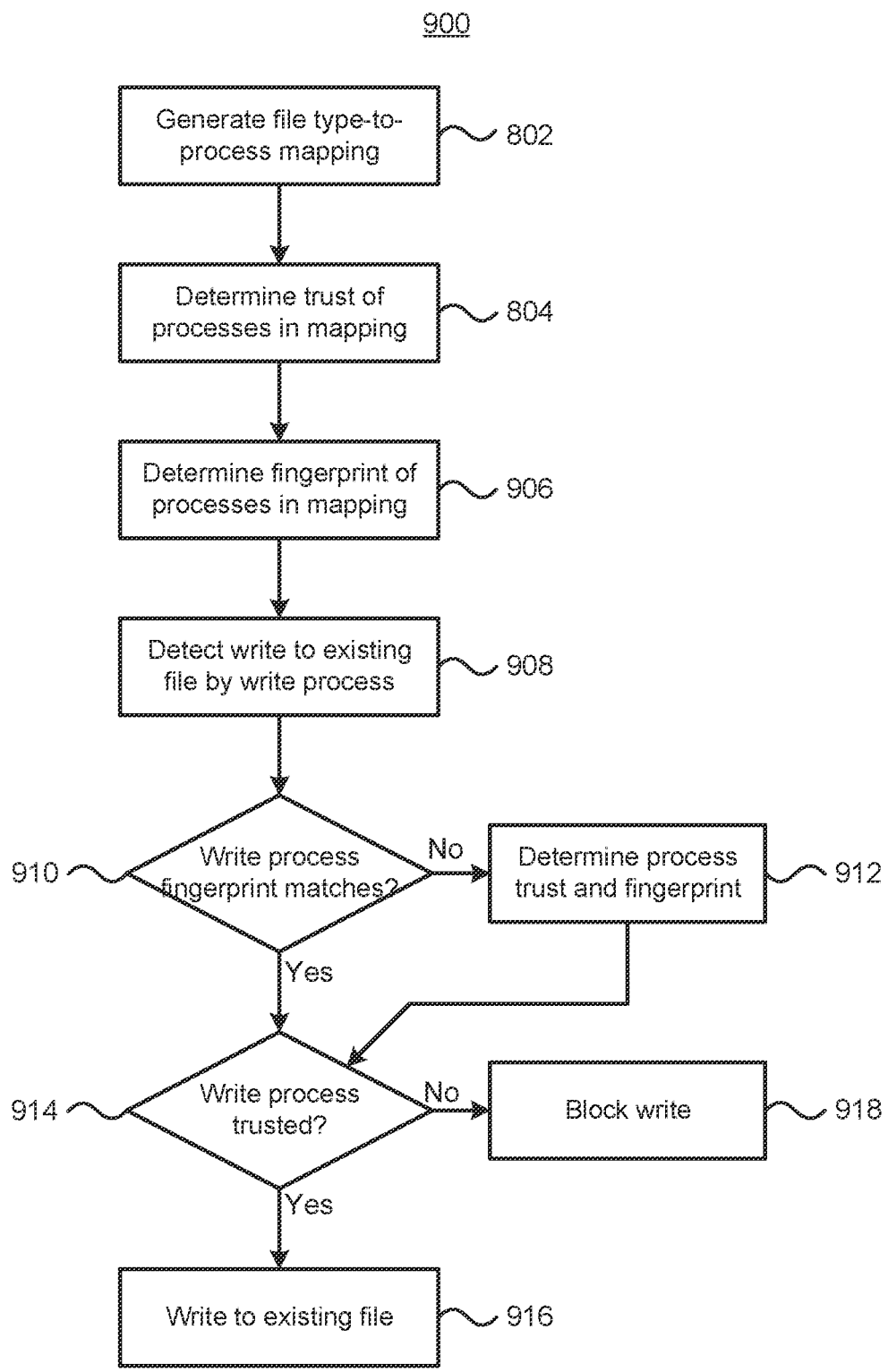
FIG. 9 depicts a further process based attack mitigation method.

FIG. 9 depicts a further process based attack mitigation method. The method 900 begins with generating a file type to process mapping (802) and then determining the trust of the processes in the mappings (804) as described above with reference to FIG. 8. Once the trust of the processes has been determined, fingerprints of the processes are determined and stored (906). The fingerprints may be determined as a cryptographic hash or other similar process that allows modifications to a process to be detected. Once the fingerprints of the processes are determined, and a write process is detected (908), the fingerprint of the write process is determined and then it is determined if the fingerprint matches the previously determined fingerprint (910). If the fingerprints do not match (No at 910), and so the process attempting to access the file differs from the process whose trust was evaluated, the trust of the process is re-evaluated and the process fingerprint determined (912). The fingerprint may only be determined for processes that are determined to be trusted in order to save computing fingerprints for untrusted processes. If the fingerprint matches (Yes at 910) or after re-evaluating the process, it is determined if the write process is trusted (914) and if it is trusted (Yes at 914) the write may proceed (916). If the process is not trusted (No at 914), the write may be blocked (918). Although depicted as determining if the fingerprints match prior to determining if a process is trusted, it is possible to first determine if the process is trusted, and then determine if the fingerprints match.

As described above, the trust of processes may be linked to the fingerprints of the processes to ensure that process are not modified after being trusted. The process may be an executable (.exe, .osx, .out), dynamically linked library (.dll), an application (.apk), binary file (.bin), a command file (.com), etc. If the process differs from what was evaluated, for example as a result of using a different .dll, the process can be re-evaluated. By fingerprinting the process, it is possible to ensure that all of the components of a process are the same as when the trust was evaluated.

Determining processes that may be used in accessing different file types may be done using a system structure of a computing device's operating system. The system structure or structures may vary from operating system to operating system. For example, in Windows, the system structure may be the registry. In macOS the system structures may comprise Uniform Type Identifiers (UTI) and Property List (PLIST) files. As described further below, the system structures or files may be processed in order to identify registered applications, file types associated with the registered applications and locations of executables for file actions such as opening, editing, saving, printing, etc.

Figure 10:
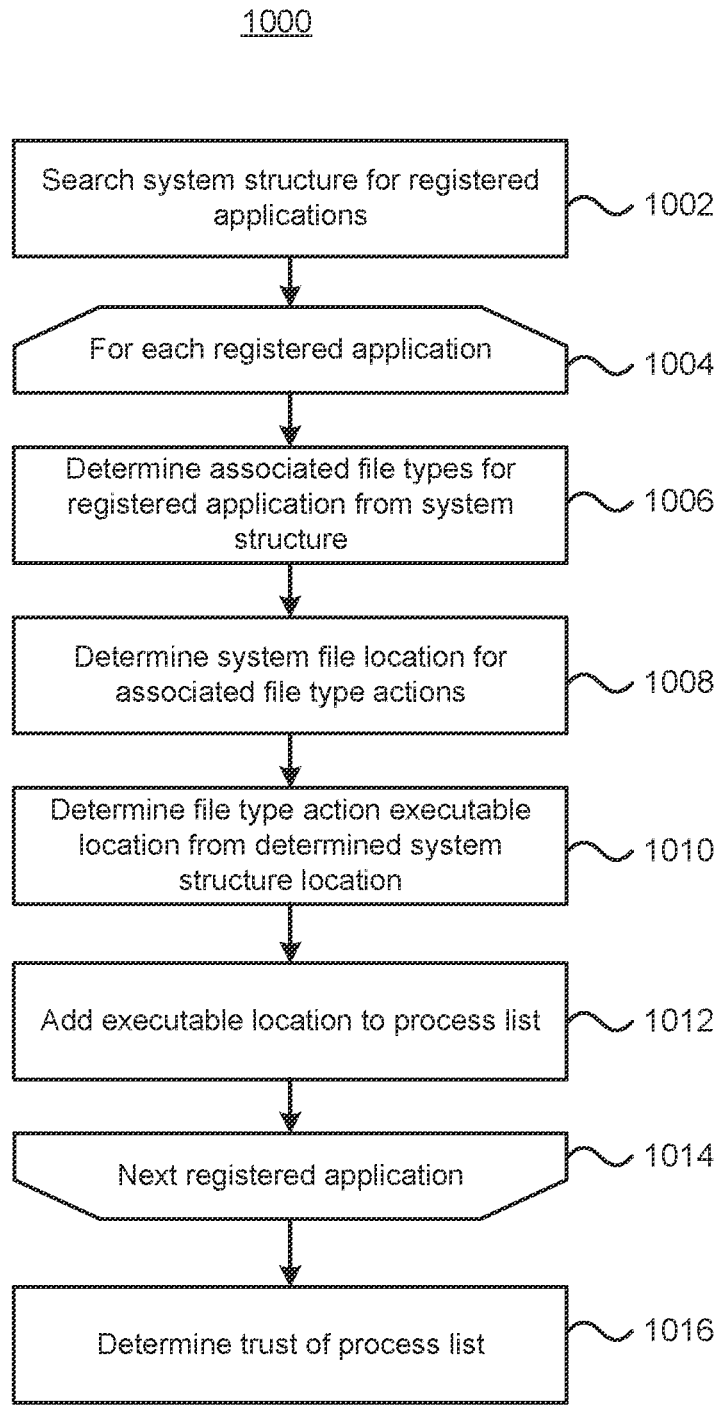
FIG. 10 depicts a method of determining trust of processes associated with file types.

FIG. 10 depicts a method of determining trust of processes associated with file types. The method 1000 is described with particular reference to determining trust of processes in a Windows operating system environment. In Windows, the system structure that may be processed in order to automatically identify processes that may be used in accessing files is the windows registry. The method begins with searching the system structure for applications that have been registered with the operating system (1002). When an application is installed, it can be registered with the operating system and information about the application stored in the registry, including information about the application, what file types it can be used to access as well as locations of executables for different file actions. Once the registered applications are determined from the registry, each of the registered applications can be processed (1004) in order to determine associated file types for the registered application (1006). For each of the file types, a location within the system structure is determined that provides executables for different file actions (1008). At the location within the system structure, the executable location within the computer's file system is determined for different file type actions (1010). Once the executable location is determined it is added to a process list (1012). Once the executable locations for the different file types of an application have been determined and added to the process list, the next registered application (1014) can be processed. The executables on the process list can then be evaluated to determine if the process is trusted (1016), and possibly determine a fingerprint of the process.

Figure 11:
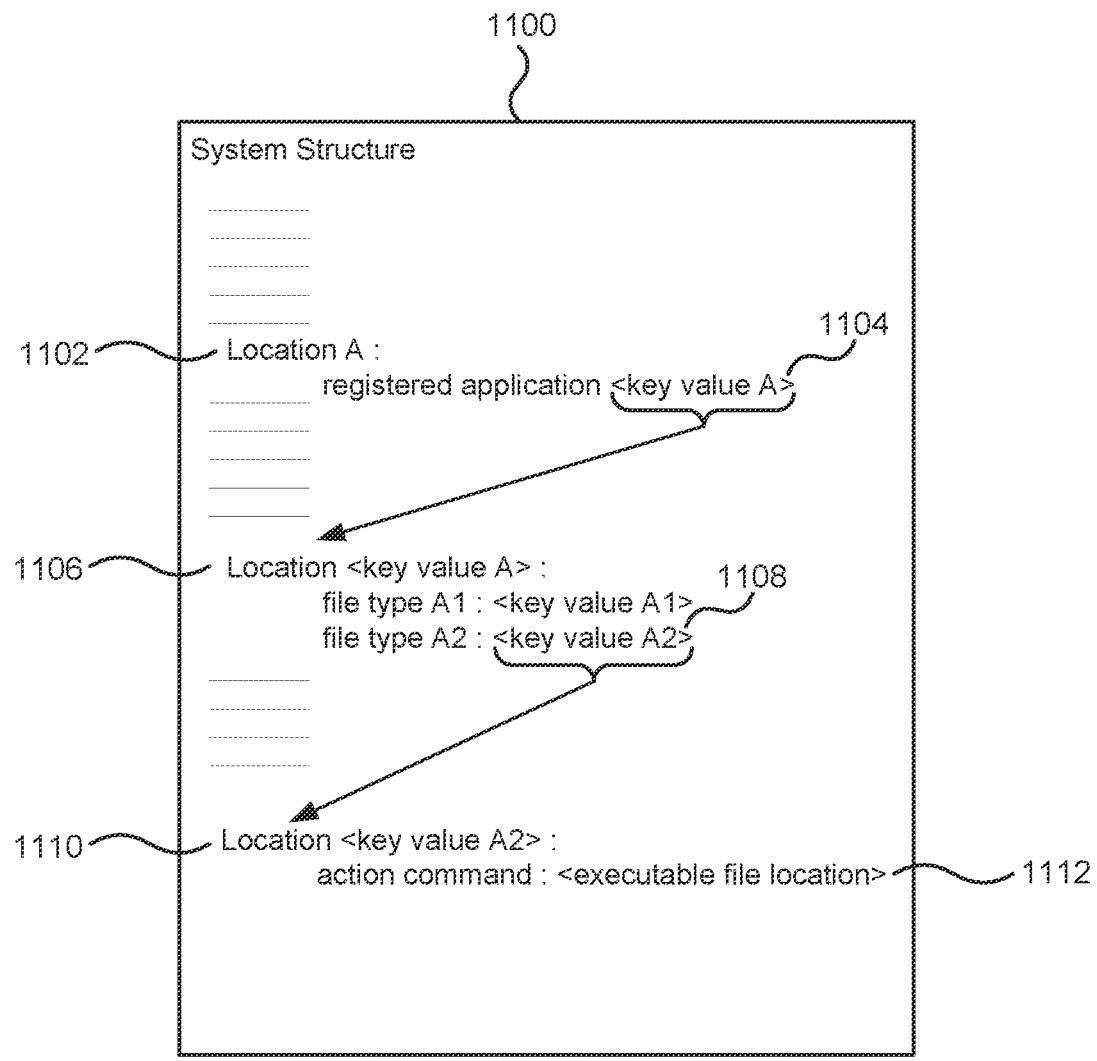
FIG. 11 depicts a system structure used in determining processes associated with file types.

FIG. 11 depicts a system structure used in determining processes associated with file types. The system structure 1100 may be for example the windows registry. As depicted, a first location 1102 may provide information on registered applications. Although only a single registered application is depicted in FIG. 1, it will be appreciated that multiple applications can be registered. Each registered application may have a key:value 1104 pair that specifies a second location within the system structure 1106. The second location may provide information on file types associated with the application. Each associated file type may include a key:value 1108 pair that specifies a third location within the system structure 1110. The third location in the system structure may specify one or more action commands for the file type and for each action command there may be a key:value pair 1112 that specifies a file system location of an executable for the file action.

By way of example, the first location within the windows registry that specifies registered applications may be "\HKEY_LOCAL_MACHINE\SOFTWARE\Registered Applications" which may have a plurality of key:value pairs for each registered application specifying a registry location. For example, one key:value pair may be "Word.Application.16: SOFTWARE\Clients\Word Processing\Microsoft Word\Capabilities" which provides a further location within the system structure. At the system structure location, key:value pairs may be specified for each of the file types associated with the application and a third location within the system structure. For example, at "\HKEY_LOCAL_MACHINE\SOFTWARE\Clients\Word Processing\Microsoft Word\Capabilities" a key pair may be ".doc:Word.Document.8" For example at the location "\HKEY_LOCAL_MACHINE\SOFTWARE\Classes\Word.Document.8" may specify shell commands for editing, opening, creating new, etc. documents of the particular file type, with the commands specified as key:value pairs providing a file system location for the command. For example, "\HKEY_LOCAL_MACHINE\SOFTWARE\Classes\Word.Document.8\shell\New\command" may have a key:value pair of "(Default): 'C:\Program Files (x86)\Microsoft Office\Office16\WINWORD.EXE'/n/f '%1'" which specifies that the executable location for new .doc documents is located in the file system at "C:\Program Files (x86)\Microsoft Office\Office16\WINWORD.EXE". The executable may be added to the process list and evaluated to determine if it is trustworthy. For example, the WINWORD.EXE may be evaluated to determine if it is from a trusted location, signed by a trusted entity, etc.

Although described above as searching for registered applications at a single location within the system structure, it is possible that registered applications can be located at other locations in the system structure. The same process may be applied to these different root locations, including for example, "\HKEY_LOCAL_MACHINE\SOFTWARE\WOW64 Node\RegisteredApplications" which may contain information about 32 bit applications on 64 bit versions of Windows, as well as "\HKEY_USERS\<USER_GUID>\SOFTWARE\RegisteredApplications" which may contain user specific software.

The above has described the system structure as being the Windows registry. It will be appreciated that other operating systems may provide similar information in different system structures. For example, Apple™ macOS as well as other Apple operating systems utilizes Uniform Type Identifiers (UTIs) to configure entity associations with programs. UTIs are essentially just reverse DNS notation specifications defined as CoreFoundation strings that uniquely identify abstract type information about in-memory or on-disk entities, such as: files, directories, frameworks, bundles, etc. UTIs are used to accomplish various tasks. For example, applications use UTIs to register their associations with Launch Services (via the Launch Services API); Pasteboard Manager uses UTIs to define correlations of held items, allowing different applications to retrieve pasteboard items in their desired format; Navigation Services uses UTIs for filtering file types; and QuickLook uses UTIs to offload previewing of files to QuickLook generators. Examples of UTIs include "com.apple.ical.ics", "com.microsoft.word.excel.xlt" and "public.jpeg" These examples enable the associations of three file type, namely iCal ics files, Microsoft Excel xlt files, and jpeg files. UTIs specific to a given vendor utilize the reverse DNS naming scheme to associate them with their organization, i.e. com.apple or com.microsoft, whereas public standards that are not associated with an organization utilize the public domain identifier.

Standard UTIs are defined by Core Services in /System/Library/CoreServices/CoreTypes.bundle/Contents/Info.plist. Take the Microsoft Excel xlt UTI as an example as defined by Core Services:

```
<dict>
    <key>UTTypeIconFiles</key>
    <array>
        <string>excel_20x20.png</string>
        <string>excel_20x20@2x.png</string>
        <string>excel_145x145.png</string>
        <string>excel_145x145@2x.png</string>
    </array>
```

-continued

```
<key>UTTypeIdentifier</key>
<string>com.microsoft.excel.xlt</string>
<key>UTTypeDescription</key>
<string>Microsoft Excel 97-2004 template</string>
<key>UTTypeConformsTo</key>
<array>
    <string>public.data</string>
    <string>public.spreadsheet</string>
</array>
<key>UTTypeTagSpecification</key>
<dict>
    <key>com.apple.ostype</key>
    <string>sLS8</string>
    <key>public.mime-type</key>
    <array>
        <string>application/vnd.ms-excel</string>
        <string>application/msexcel</string>
    </array>
    <key>public.filename-extension</key>
    <string>xlt</string>
</dict>
</dict>
```

QuickLook, introduced in macOS X 10.5, enables quick previews from Finder of various file types. This offloads preview look-ups to qlgenerator plugin extensions (i.e bundles) that are installed either system-wide (at/System/Library/QuickLook) or per-user (at ~/Library/QuickLook). Take for example the com. adobe .pdf qlgenerator extension which maps to the bundle installed at /System/Library/QuickLook/PDF.qlgenerator. From the bundle's Info.plist the CFBundleDocumentTypes array contains the specified UTI:

```
<key>CFBundleDocumentTypes</key>
<array>
    <dict>
        <key>CFBundleTypeRole</key>
        <string>QLGenerator</string>
        <key>LSItemContentTypes</key>
        <array>
            <string>com.adobe.pdf</string>
        </array>
    </dict>
</array>
```

Additionally, the bundle is declared as a QuickLookGeneratorPluginFactory, which is what defines the .qlgenerator extensions:

```
<key>CFPlugInFactories</key>
<dict>
    <key>0D5B252D-0B33-4E7A-88E2-C77728B9C565</key>
    <string>QuickLookGeneratorPluginFactory</string>
</dict>
```

The info.plist also declares other QuickLook settings on a per-plugin basis, including: QLNeedsToBeRunInMainThread, QLSupportsConcurrentRequests and QLThumbnailMinimumSize. The .qlgenerator extension is a specially compiled program implementing a QuickLookGeneratorPluginFactory entry point. The QuickLook plugin mappings can be dumped via the qlmanage utility UTIs are supported in macOS X 10.3+, iOS 3.0+, tvOS 9.0+ and watchOS 2.0+. They can be programmatically queried via UTType that is part of the ApplicationServices framework for macOS X and MobileCoreServices framework for iOS, tvOS and watchOS. Using this API it is possible to process the system structure to identify all specified UTIs on a given host; identify the default handler for a given UTI; correlate UTI mappings to the registered applications or bundles that support them; identify a specified application or bundle's registered UTIs; as well as set a UTI handler.

It is possible to quickly identify all information regarding a specified UTI, such as com.apple.ical.ics, using the command:
  %./uti-e com.apple.ical.ics
which returns:

```
identifier: com.apple.ical.ics
description: ICS File
declaration: {
    UTTypeTagSpecification = {
        public.mime-type = [
            text/calendar
        ]
        public.filename-extension = [
            ics
        ]
    }
    UTTypeConformsTo = [
        public.text
        public.item
        public.calendar-event
    ]
    UTTypeIdentifier = com.apple.ical.ics
}
```

It is noted that the above output is a mirror of the specification in the Core Services Info.plist as described earlier.

Consider the example of wanting to know all of the bundles that are registered to handle com.apple.ical.ics UTI:
  %./uti-l com.apple.ical.ics
which returns:

```
com.apple.CalendarFileHandler
com.apple.iCal
com.apple.TextEdit
com.apple.dt.Xcode
com.apple.Notes
```

In order to determine the default handler for the com.apple.ical.ics UTI:
  %./uti-d com.apple.ical.ics
which returns:
  com.apple.CalendarFileHandler It is also possible to identify the default UTI mapping for a specific file extension to the supported bundle handlers:
  %./uti-x ics
which returns:

```
CalendarFileHandler.app
/System/Library/CoreServices/CalendarFileHandler.app
com.apple.CalendarFileHandler
```

Alternatively, for jpeg files:

```
% ./uti -x jpg
Preview.app
/System/Applications/Preview.app
com.apple.Preview
```

From the above, it will be appreciated that different operating systems will have a respective system structure, which may comprise one or more files, databases, etc. that allow the different applications on the computer system to be determined along with the file types that can be opened or edited by the applications. The trust of the determined applications may then be determined and used in determining if file access should be allowed or blocked. As described above, it is possible to automatically determine different applications/processes that may be used to access different file types and so to easily block file access based on trusted processes.

It will be appreciated by one of ordinary skill in the art that the system and components shown in FIGS. 1-11 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Each element in the embodiments of the present disclosure may be implemented as hardware, software/program, or any combination thereof. Software codes, either in its entirety or a part thereof, may be stored in a computer readable medium or memory, or non-transitory memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

What is claimed is:

1. A method of preventing a ransomware attack comprising:
    storing seeded files on a storage medium;
    receiving at a file system an input/output (IO) request from a requesting process;
    determining a trust classification of the requesting process based on whether the requesting process is a trusted process;
    modifying results of the IO request based on the trust classification of the requesting process, wherein modifying the results comprises:
        when the requesting process is untrusted, including the seeded files in the results provided to the requesting process, and
        when the requesting process is trusted, removing the seeded files from the results provided to the requesting process; and
    monitoring one or more IO requests of the modified results from the requesting process when the requesting process is determined to have an untrusted trust classification.

2. The method of claim 1, further comprising one or more of:
    restricting further file access of a process that is untrusted when the process attempts to access one or more files of the modified results; and
    quarantining the requesting process.

3. The method of claim 2, wherein limiting further file access comprises one or more of:
    preventing the process that is untrusted from reading files;
    preventing the process that is untrusted from writing files;
    preventing the process that is untrusted from deleting files; and
    preventing the process that is untrusted from moving files.

4. The method of claim 1, wherein the seeded files are identified using one or more of:
    a defined naming convention; and
    a list of seeded file names.

5. The method of claim 1, wherein the seeded files are added to the results presented to the requesting process when it is untrusted.

6. The method of claim 5, wherein only the seeded files are presented as the results to the requesting process when it is untrusted.

7. The method of claim 1, wherein the file system runs in kernel mode and the requesting process runs in user mode or kernel mode.

8. The method of claim 1, wherein monitoring the one or more IO requests of the modified results comprises:
    detecting a write process to one or more of the modified results;
    determining if content being written by the write process is encrypted; and
    blocking the write process when the content being written is determined to be encrypted.

9. A system for preventing a ransomware attack comprising:
    a processor for executing instructions;
    a memory for storing instructions, which when executed by the processor, configure the system to perform a method comprising:
        storing seeded files on a storage medium;
        receiving at a file system an input/output (IO) request from a requesting process;
        determining a trust classification of the requesting process based on whether the requesting process is a trusted process;
        modifying results of the IO request based on the trust classification of the requesting process, wherein modifying the results comprises:
            when the requesting process is untrusted, including the seeded files in the results provided to the requesting process, and
            when the requesting process is trusted, removing the seeded files from the results provided to the requesting process; and
        monitoring one or more IO requests of the modified results from the requesting process when the requesting process is determined to have an untrusted trust classification.

10. The system of claim 9, wherein the method configured by the instructions further comprises one or more of:
    restricting further file access of a process that is untrusted when the process attempts to access one or more files of the modified results; and
    quarantining the requesting process.

11. The system of claim 10, wherein limiting further file access comprises one or more of:
    preventing the process that is untrusted from reading files;
    preventing the process that is untrusted from writing files;
    preventing the process that is untrusted from deleting files; and
    preventing the process that is untrusted from moving files.

12. The system of claim 9, wherein the seeded files are identified using one or more of:
    a defined naming convention; and
    a list of seeded file names.

13. The system of claim 9, wherein the seeded files are added to the results presented to the requesting process when it is untrusted.

14. The system of claim 13, wherein only the seeded files are presented as the results to the requesting process when it is untrusted.

15. The system of claim 9, wherein the file system runs in kernel mode and the requesting process runs in user mode or kernel mode.

16. The system of claim 9, wherein monitoring the one or more IO requests of the modified results comprises:
  detecting a write process to one or more of the modified results;
  determining if content being written by the write process is encrypted; and
  blocking the write process when the content being written is determined to be encrypted.

17. A non-transitory computer readable media having stored thereon instructions, which when executed by a processor of a computer system, configure the computer system to perform a method comprising:
  storing seeded files on a storage medium;
  receiving at a file system an input/output (IO) request from a requesting process;
  determining a trust classification of the requesting process based on whether the requesting process is a trusted process;
  modifying results of the IO request based on the trust classification of the requesting process, wherein modifying the results comprises:
    when the requesting process is untrusted, including the seeded files in the results provided to the requesting process, and
    when the requesting process is trusted, removing the seeded files from the results provided to the requesting process; and
  monitoring one or more IO requests of the modified results from the requesting process when the requesting process is determined to have an untrusted trust classification.

18. The non-transitory computer readable media of claim 17, wherein the method configured by the instructions further comprises one or more of:
  restricting further file access of a process that is untrusted when the process attempts to access one or more files of the modified results; and
  quarantining the requesting process.

19. The non-transitory computer readable media of claim 18, wherein limiting further file access comprises one or more of:
  preventing the process that is untrusted from reading files;
  preventing the process that is untrusted from writing files;
  preventing the process that is untrusted from deleting files; and
  preventing the process that is untrusted from moving files.

20. The non-transitory computer readable media of claim 17, wherein the seeded files are identified using one or more of:
  a defined naming convention; and
  a list of seeded file names.

21. The non-transitory computer readable media of claim 17, wherein the seeded files are added to the results presented to the requesting process when it is untrusted.

22. The non-transitory computer readable media of claim 21, wherein only the seeded files are presented as the results to the requesting process when it is untrusted.

23. The non-transitory computer readable media of claim 17, wherein the file system runs in kernel mode and the requesting process runs in user mode or kernel mode.

24. The non-transitory computer readable media of claim 17, wherein monitoring the one or more IO requests of the modified results comprises:
  detecting a write process to one or more of the modified results;
  determining if content being written by the write process is encrypted; and
  blocking the write process when the content being written is determined to be encrypted.

25. A method of preventing a ransomware attack comprising:
  receiving at a file system an input/output (IO) request from a requesting process;
  determining a trust classification of the requesting process based on whether the requesting process is a trusted process;
  modifying results of the IO request based on the trust classification of the requesting process, wherein modifying the results comprises:
    when the requesting process is untrusted, adding seeded files to the results presented to the requesting process, and
    when the requesting process is trusted, excluding the seeded files from the results provided to the requesting process; and
  monitoring one or more IO requests of the modified results from the requesting process when the requesting process is determined to have an untrusted trust classification.

26. The method of claim 25, wherein only the seeded files are presented as the results to the requesting process when it is untrusted.

27. A system for preventing a ransomware attack comprising:
  a processor for executing instructions;
  a memory for storing instructions, which when executed by the processor, configure the system to perform a method comprising:
    receiving at a file system an input/output (IO) request from a requesting process;
    determining a trust classification of the requesting process based on whether the requesting process is a trusted process;
    modifying results of the IO request based on the trust classification of the requesting process, wherein modifying the results comprises:
      when the requesting process is untrusted, adding seeded files to the results presented to the requesting process, and
      when the requesting process is trusted, removing the seeded files from the results provided to the requesting process; and
    monitoring one or more IO requests of the modified results from the requesting process when the requesting process is determined to have an untrusted trust classification.

28. The system of claim 27, wherein only the seeded files are presented as the results to the requesting process when it is untrusted.

29. A non-transitory computer readable media having stored thereon instructions, which when executed by a processor of a computer system, configure the computer system to perform a method comprising:
  receiving at a file system an input/output (IO) request from a requesting process;

determining a trust classification of the requesting process based on whether the requesting process is a trusted process;

modifying results of the IO request based on the trust classification of the requesting process, wherein modifying the results comprises:

when the requesting process is untrusted, adding seeded files to the results presented to the requesting process, and when the requesting process is trusted, removing the seeded files from the results provided to the requesting process; and monitoring one or more IO requests of the modified results from the requesting process when the requesting process is determined to have an untrusted trust classification.

30. The non-transitory computer readable media of claim 29, wherein only the seeded files are presented as the results to the requesting process when it is untrusted.

31. A method of preventing a ransomware attack comprising:

storing seeded files on a storage medium;

receiving at a file system an input/output (IO) request from a requesting process;

receiving results of the IO request that include actual files and the seeded files;

determining a trust classification of the requesting process based on whether the requesting process is a trusted process;

modifying the results of the IO request based on the trust classification of the requesting process; and monitoring one or more IO requests of the modified results from the requesting process when the requesting process is determined to have an untrusted trust classification, wherein modifying the results comprises:

when the requesting process is untrusted, including the seeded files in the results provided to the requesting process; and when the requesting process is trusted, removing the seeded files from the results presented to the requesting process.

32. A system for preventing a ransomware attack comprising:

a processor for executing instructions;

a memory for storing instructions, which when executed by the processor, configure the system to perform a method comprising:

storing seeded files on a storage medium;

receiving at a file system an input/output (IO) request from a requesting process;

receiving results of the IO request that include actual files and the seeded files;

determining a trust classification of the requesting process based on whether the requesting process is a trusted process;

modifying the results of the IO request based on the trust classification of the requesting process; and monitoring one or more IO requests of the modified results from the requesting process when the requesting process is determined to have an untrusted trust classification, wherein modifying the results comprises:

when the requesting process is untrusted, including the seeded files in the results provided to the requesting process; and when the requesting process is trusted, removing the seeded files from the results presented to the requesting process.

33. A non-transitory computer readable media having stored thereon instructions, which when executed by a processor of a computer system, configure the computer system to perform a method comprising:

storing seeded files on a storage medium;

receiving at a file system an input/output (IO) request from a requesting process;

receiving results of the IO request that include actual files and the seeded files;

determining a trust classification of the requesting process based on whether the requesting process is a trusted process;

modifying results of the IO request based on the trust classification of the requesting process; and monitoring one or more IO requests of the modified results from the requesting process when the requesting process is determined to have an untrusted trust classification, wherein modifying the results comprises:

when the requesting process is untrusted, including the seeded files in the results provided to the requesting process; and when the requesting process is trusted, removing the seeded files from the results presented to the requesting process.

* * * * *